(12) United States Patent
Shao

(10) Patent No.: US 9,246,176 B2
(45) Date of Patent: Jan. 26, 2016

(54) METHOD TO PREPARE FULL MONOLAYER OF PLATINUM ON PALLADIUM BASED CORE NANOPARTICLES

(75) Inventor: Minhua Shao, Farmington, CT (US)

(73) Assignee: Audi AG, Ingolstadt (DE)

( * ) Notice: Subject to any disclaimer, the term of this patent is extended or adjusted under 35 U.S.C. 154(b) by 239 days.

(21) Appl. No.: 13/983,174

(22) PCT Filed: Feb. 3, 2011

(86) PCT No.: PCT/US2011/023585
§ 371 (c)(1),
(2), (4) Date: Aug. 1, 2013

(87) PCT Pub. No.: WO2012/105978
PCT Pub. Date: Aug. 9, 2012

(65) Prior Publication Data
US 2013/0324391 A1   Dec. 5, 2013

(51) Int. Cl.
| | |
|---|---|
| *B01J 23/42* | (2006.01) |
| *H01M 4/92* | (2006.01) |
| *H01M 4/86* | (2006.01) |
| *B01J 37/18* | (2006.01) |
| *B01J 37/34* | (2006.01) |
| *B01J 23/44* | (2006.01) |
| *B01J 23/54* | (2006.01) |
| *B01J 23/72* | (2006.01) |
| *B01J 23/89* | (2006.01) |
| *B01J 35/00* | (2006.01) |

(52) U.S. Cl.
CPC ............ *H01M 4/92* (2013.01); *B01J 23/42* (2013.01); *B01J 23/44* (2013.01); *B01J 23/54* (2013.01); *B01J 23/72* (2013.01); *B01J 23/8926* (2013.01); *B01J 35/008* (2013.01); *B01J 37/18* (2013.01); *B01J 37/348* (2013.01); *H01M 4/8657* (2013.01); *H01M 4/921* (2013.01); *Y02E 60/50* (2013.01)

(58) Field of Classification Search
CPC .................................. B01J 23/42; B01J 23/44
USPC .................................................. 502/339, 325
See application file for complete search history.

(56) References Cited

U.S. PATENT DOCUMENTS

| | | | |
|---|---|---|---|
| 7,507,495 | B2 | 3/2009 | Wang et al. |
| 2007/0026292 | A1 | 2/2007 | Adzic et al. |
| 2007/0031722 | A1 | 2/2007 | Adzic et al. |
| 2010/0062929 | A1 | 3/2010 | Virkar |
| 2010/0216632 | A1 | 8/2010 | Adzic et al. |
| 2010/0251856 | A1 | 10/2010 | Santhanam et al. |
| 2012/0010069 | A1 | 1/2012 | Takehiro et al. |
| 2012/0208105 | A1 | 8/2012 | Arai et al. |

FOREIGN PATENT DOCUMENTS

| | | |
|---|---|---|
| CN | 101327454 A | 12/2008 |
| JP | 2008-525638 A | 7/2008 |
| JP | 2011-526655 A | 10/2011 |
| JP | 2011-218278 A | 11/2011 |
| JP | 2012/011170 A1 | 1/2012 |
| JP | 2012-16684 A | 1/2012 |
| WO | 2010/005773 A1 | 1/2010 |

OTHER PUBLICATIONS

The PCT International Search Report mailed Oct. 27, 2011 for International Application No. PCT/US2011/023585.
Extended European Search Report, mailed Aug. 1, 2014, for European Application No. 11857629.7—1352 / 2670527, 7 pages.

*Primary Examiner* — Edward Johnson
(74) *Attorney, Agent, or Firm* — Seed IP Law Group PLLC

(57) ABSTRACT

A method for forming catalytic nanoparticles includes forming core-shell catalytic nanoparticles and processing the core-shell catalytic nanoparticles. The core-shell catalytic nanoparticles have a palladium core enclosed by a platinum shell. The core-shell catalytic nanoparticles are processed to increase the percentage of the surface area of the core-shell catalytic nanoparticles covered by the platinum shell.

19 Claims, 5 Drawing Sheets

METHOD TO PREPARE FULL MONOLAYER OF PLATINUM ON PALLADIUM BASED CORE NANOPARTICLES

BACKGROUND

Electrodes containing supported platinum catalyst particles are used in electrochemical cells, such as fuel cells. For example, in a conventional hydrogen fuel cell, a supported platinum catalyst is used to oxidize hydrogen gas into protons and electrons at the anode of the fuel cell. At the cathode of the fuel cell, another supported platinum catalyst triggers an oxygen reduction reaction (ORR), leading to the formation of water.

The platinum catalyst particles can be core-shell catalyst particles having a palladium core and a platinum shell. Core-shell catalyst particles have an increased ORR activity compared to previous platinum catalysts, such as platinum nanoparticles. Core-shell catalyst particles also have a reduced material cost because expensive platinum is only used to cover the outer surface of the core.

The platinum shell is an atomically thin layer of platinum atoms that encapsulates the palladium core. While the platinum atoms cover the majority of the core, the shell can have voids, holes or gaps, known as pinholes. These pinholes expose the palladium core.

SUMMARY

A method for forming catalytic nanoparticles includes forming core-shell catalytic nanoparticles and processing the core-shell catalytic nanoparticles. The core-shell catalytic nanoparticles have a palladium core enclosed by a platinum shell. The core-shell catalytic nanoparticles are processed to increase the percentage of the surface area of the core-shell catalytic nanoparticles covered by the platinum shell.

DETAILED DESCRIPTION

Methods for increasing the percentage of surface area of a core-shell catalytic nanoparticle covered by platinum are described herein. Core-shell catalytic nanoparticles having a palladium core and a platinum shell can be used in electrochemical cells, such as fuel cells, to promote the rates of the electrochemical reactions. The core-shell structure reduces material costs and improves the oxygen reduction reaction (ORR) activity. The core-shell catalytic nanoparticles can be formed by copper underpotential deposition-displacement methods. Although a full platinum monolayer can be deposited on a smooth surface using copper underpotential deposition-displacement methods, a full platinum monolayer may not be achieved on the surfaces of a nanoparticle. The methods described herein create a more complete platinum shell on the palladium core and increase the platinum mass activity.

Figure 1:
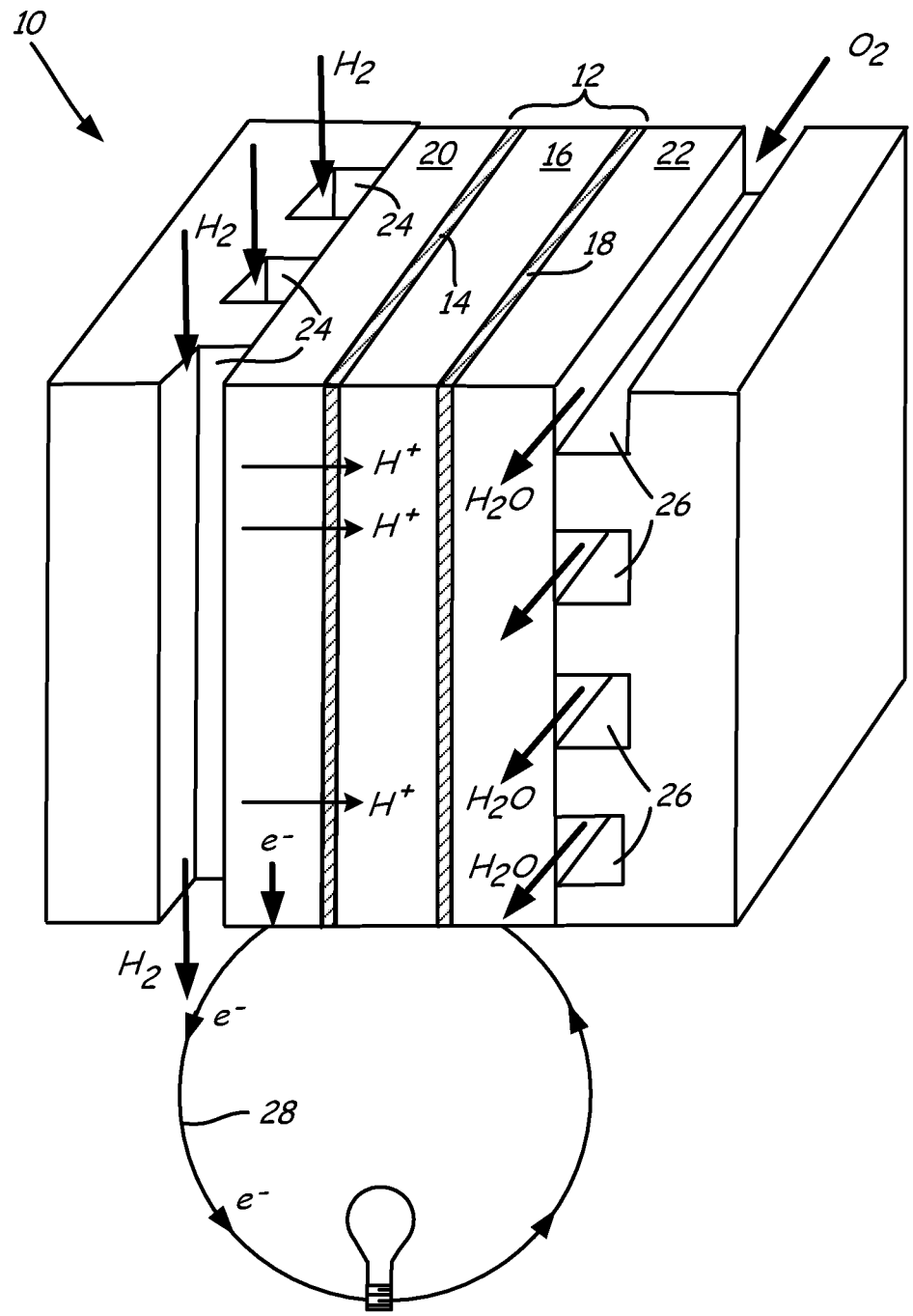
FIG. 1 is a perspective view of a fuel cell repeat unit having a catalyst layer.

Fuel cells convert chemical energy to electrical energy using one or more fuel cell repeat units. FIG. 1 illustrates a perspective view of one example fuel cell repeat unit 10, which includes membrane electrode assembly (MEA) 12 (having anode catalyst layer (CL) 14, electrolyte 16, cathode catalyst layer (CL) 18), anode gas diffusion layer (GDL) 20 and cathode gas diffusion layer (GDL) 22, anode flow field 24 and cathode flow field 26. Fuel cell repeat unit 10 can have coolant flow fields adjacent to anode flow field 24 and cathode flow field 26. Coolant flow fields are not illustrated in FIG. 1.

Anode GDL 20 faces anode flow field 24 and cathode GDL 22 faces cathode flow field 26. Anode CL 14 is positioned between anode GDL 20 and electrolyte 16, and cathode CL 18 is positioned between cathode GDL 22 and electrolyte 16. This assembly, once bonded together by known techniques, is known as a unitized electrode assembly (UEA). In one example, fuel cell repeat unit 10 is a proton exchange membrane fuel cell (PEMFC) that uses hydrogen fuel (i.e., hydrogen gas) and oxygen oxidant (i.e., oxygen gas or air). It is recognized that fuel cell repeat unit 10 can use alternative fuels and/or oxidants.

In operation, anode GDL 20 receives hydrogen gas ($H_2$) by way of anode flow field 24. Anode CL 14, which contains a catalyst such as platinum, causes the hydrogen molecules to split into protons ($H^+$) and electrons ($e^-$). The protons and electrons travel to cathode CL 18; the protons pass through electrolyte 16 to cathode CL 18, while the electrons travel through external circuit 28, resulting in a production of electrical power. Air or pure oxygen ($O_2$) is supplied to cathode GDL 22 through cathode flow field 26. At cathode CL 18, oxygen molecules react with the protons and electrons from anode CL 14 to form water ($H_2O$), which then exits fuel cell 10, along with excess heat.

Electrolyte 16 is located between anode CL 14 and cathode CL 18. Electrolyte 16 allows movement of protons and water but does not conduct electrons. Protons and water from anode CL 14 can move through electrolyte 16 to cathode CL 18. Electrolyte 16 can be a liquid, such as phosphoric acid, or a solid membrane, such as a perfluorosulfonic acid (PFSA)-containing polymer or ionomer. PFSA polymers are composed of fluorocarbon backbones with sulfonate groups attached to short fluorocarbon side chains. Example PFSA polymers include Nafion® by E.I. DuPont, USA.

Anode CL 14 is adjacent to the anode side of electrolyte 16. Anode CL 14 includes a catalyst, which promotes electrochemical oxidation of fuel (i.e., hydrogen). Example catalysts for anode CL 14 include carbon supported platinum nanoparticles and the core-shell catalyst nanoparticles described further below.

Cathode CL 18 is adjacent to the cathode side of electrolyte 16 and opposite anode CL 14. Cathode CL 18 includes an ionomer and core-shell catalyst nanoparticles, which are described further below. The ionomer connects electrolyte 16 to the core-shell catalyst nanoparticles on an ionic conductor level. The ionomer creates a porous structure that enables gas to travel through cathode CL 18 and water to be removed from cathode CL 18. The ionomer also transfers protons from electrolyte 16 to active catalyst sites on the core-shell catalyst nanoparticles. The core-shell catalyst nanoparticles are only active when they are accessible to protons, electrons and the reactant. Alternatively, a binder, such as Teflon® by DuPont, can be used in place of an ionomer to connect the core-shell catatlyst nanoparticles.

Figure 2:
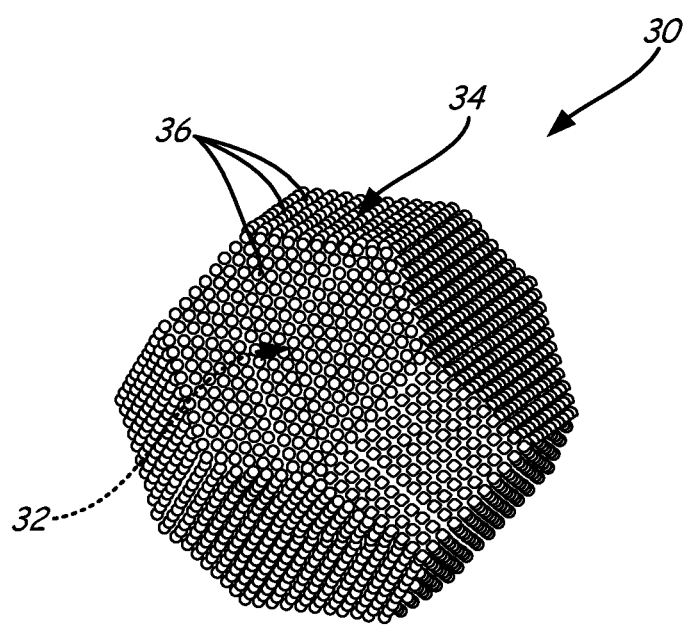
FIG. 2 is an enlarged view of the of a core-shell catalyst for use in the catalyst layer of FIG. 1.

An enlarged view of core-shell catalyst nanoparticle 30 is shown in FIG. 2. Core-shell catalyst nanoparticle 30 includes palladium core 32 and platinum shell 34 (formed by platinum atoms 36). Platinum shell 34 generally encloses or surrounds palladium core 32. In cathode CL 18, core-shell catalyst nanoparticle 30 promotes the formation of water according to the oxidation reduction reaction: $O_2 + 4H^+ + 4e^- \rightarrow 2H_2O$. Core-shell catalyst nanoparticle 30 has an enhanced activity towards oxygen reduction compared to previous carbon supported platinum catalysts. Further, the core-shell structure reduces platinum usage, and thus material costs because platinum shell 34 is only a thin layer of platinum atoms 36 on the outer surface of palladium core 32; palladium core 32 comprises lower cost palladium.

Palladium core 32 is a nanoparticle. In one example, palladium core 32 has a diameter between about 2 nanometers and about 50 nanometers. Palladium core 32 is formed from palladium or a palladium alloy.

Platinum atoms 36 form platinum shell 34 on the outer surface of palladium core 32. Platinum shell 34 generally encloses palladium core 32. Platinum shell 34 is formed by an atomically thin layer of platinum atoms 36 on palladium core 32. In one example, platinum atoms 36 form a monolayer, bilayer or trilayer on palladium core 32. Platinum atoms 36 can be deposited using a copper-underpotential deposition-displacement method, as described further below. Platinum atoms 36 deposited on a smooth surface using a copper-underpotential deposition-displacement method can form a complete monolayer. However, platinum atoms 36 deposited on a nanoparticle, such as palladium core 32, may not achieve a complete monolayer. Spaces or gaps between platinum atoms 36, which are known as pinholes, can form in platinum shell 34. Additionally, copper from the copper-underpotential deposition-displacement method can oxidize and prevent displacement by platinum. Forming a more complete platinum shell 34 on palladium core 32 increases the percentage of surface area of core-shell catalytic nanoparticles 30 covered by platinum atoms 36. Forming a more complete platinum shell 34 also increases the platinum mass activity and improves the efficiency of the fuel cell because of the increased available platinum surface area.

Figure 3A:
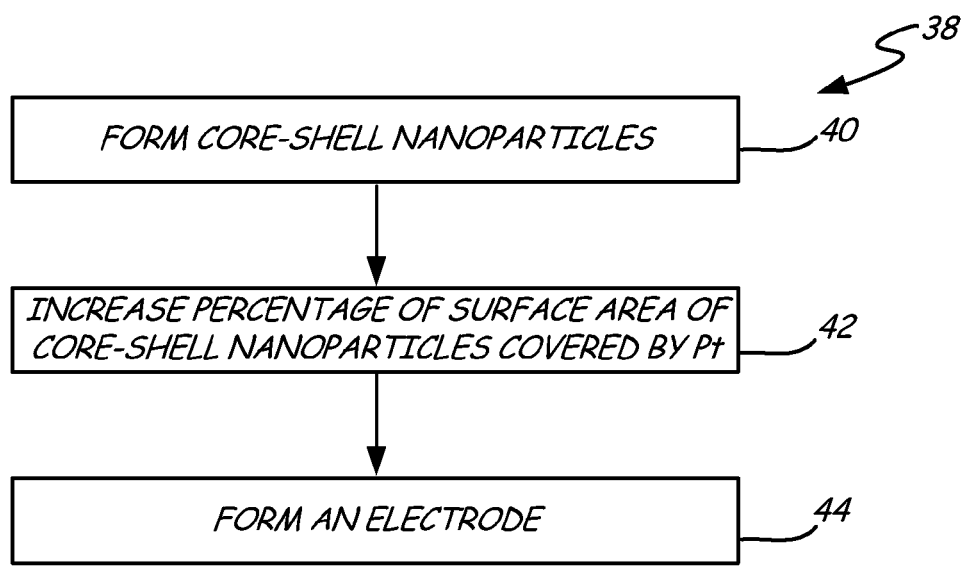
FIG. 3A is a block diagram illustrating a method of producing a core-shell catalytic nanoparticle having an increased percentage of surface area covered by platinum.

FIG. 3A is a block diagram illustrating method 38 of producing a core-shell catalytic nanoparticle having a more complete platinum shell. Method 38 includes the steps of forming a core-shell nanoparticle (step 40), increasing the percentage of surface area of the core-shell nanoparticle covered by platinum (step 42), and forming an electrode with the core-shell catalytic nanoparticle (step 44).

In step 40, a core-shell catalytic nanoparticle is formed. The core-shell catalytic nanoparticle has a structure similar to that of core-shell catalytic nanoparticle 30 of FIG. 2. The core-shell catalytic nanoparticle has a palladium or palladium alloy core generally enclosed by a shell. The shell is an atomically thin layer of platinum or platinum alloy atoms. In one example, the shell is a monolayer, bilayer or trilayer of platinum or a platinum alloy. The core-shell catalytic nanoparticle has a diameter between about 2 nanometers and about 50 nanometers.

After the core-shell catalytic nanoparticle is formed, the core-shell catalytic nanoparticle is further processed in step 42 to increase the percentage of the core-shell catalytic nanoparticle surface area covered by platinum. In step 42, the final structure of the core-shell catalytic nanoparticle is enhanced to increase the platinum mass activity. As described further below, the final structure of the core-shell catalytic nanoparticle can be enhanced by depositing additional platinum on the core-shell catalytic nanoparticle to fill in pinholes or gaps between platinum atoms or by subjecting the core-shell catalytic nanoparticle to potential cycling.

When initially formed, the shell of the core-shell catalytic nanoparticle will not be a complete layer of platinum or platinum alloy atoms. Although platinum atoms will deposit to form a complete monolayer on a smooth surface, platinum atoms will not form a complete monolayer on a nanoparticle. As described further below, gaps or spaces will form between some platinum atoms. Non-platinum atoms can also occupy regions of the core-shell catalytic nanoparticle surface and prevent the formation of a complete platinum shell. The core-shell catalytic nanoparticle is further processed in step 42 to increase the percentage of the surface area of the core-shell catalytic nanoparticles covered by platinum. Increasing the surface area percentage of the core-shell catalytic nanoparticles covered by platinum increases the activity of the catalyst particles.

In step 44, an electrode is formed with the core-shell catalytic nanoparticle of step 42. The electrode can include a catalytic layer comprised of an ionomer and the core-shell catalytic nanoparticle. The electrode can be incorporated into an electrochemical cell, such as a fuel cell.

Figure 3B:
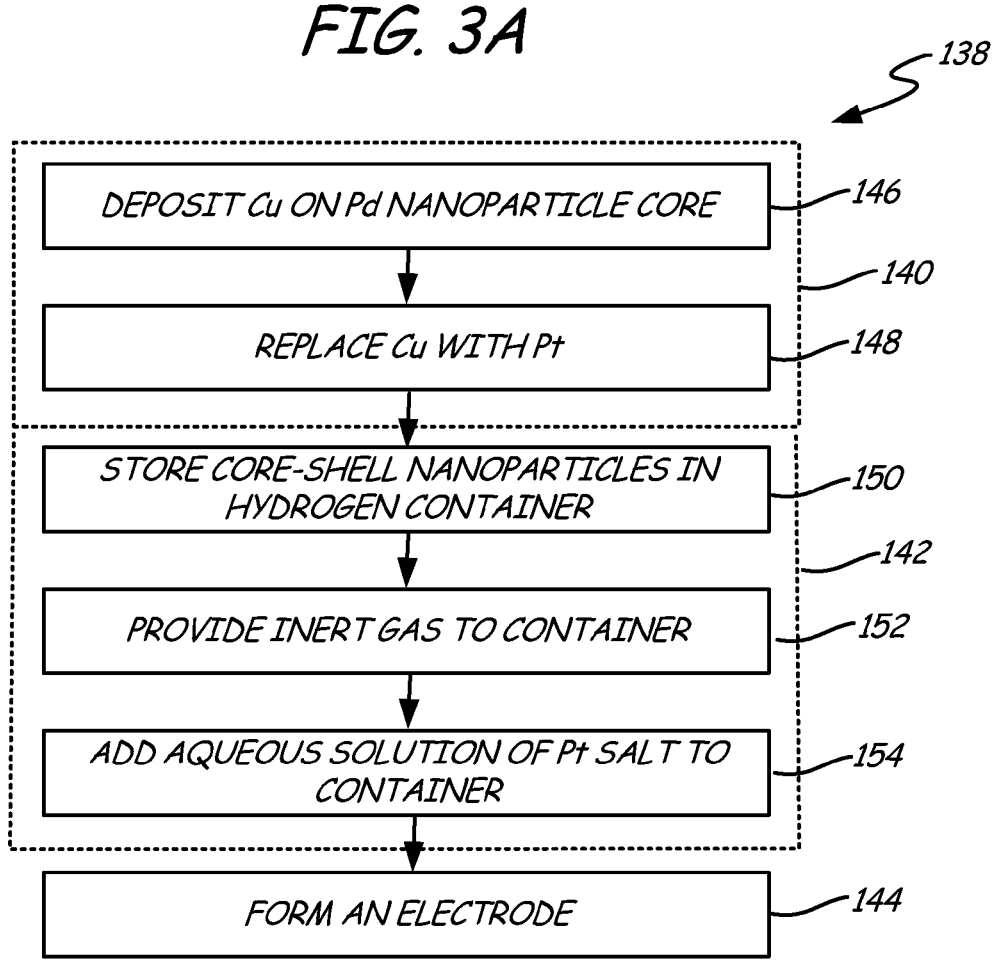
FIG. 3B is a block diagram illustrating one method of increasing percentage of surface area of the core-shell catalytic nanoparticle covered by platinum.

FIG. 3B illustrates a specific example 138 in which platinum atoms are deposited on the surface of the core-shell catalytic nanoparticles to fill the pinholes. Method 138 includes the steps of forming core-shell catalytic nanoparticles (step 140), increasing the percentage of surface area of the core-shell catalytic nanoparticles covered by platinum (step 142), and forming an electrode (step 144). Forming the core-shell catalytic nanoparticles comprises depositing copper on palladium nanoparticle cores (step 146), and replacing the copper with platinum (step 148).

In step 146, copper is deposited on palladium nanoparticle cores by underpotential deposition. Underpotential deposition is an electrochemical process that results in the deposition of one or two monolayers of a metal onto the surface of another metal at a potential positive of the thermodynamic potential for the reaction. In step 146, only one monolayer of copper is deposited on the palladium core. Thermodynamically, underpotential deposition occurs because the work function of copper is lower than that of the palladium nanoparticle cores.

In step 146, copper is deposited as a continuous or semi-continuous monolayer of copper atoms on the palladium nanoparticle cores. In one example, palladium nanoparticle cores deposited on an electrically conductive substrate were placed in a solution consisting of 0.05 M $CuSO_4$+0.05 M $H_2SO_4$ saturated with argon. The potential was controlled at 0.1 V (vs. Ag/AgCl, 3M) for 5 minutes resulting in the underpotential deposition of copper on the palladium nanoparticle cores.

Next in step 148, platinum is deposited on the palladium core by displacing the copper atoms. Replacing copper with platinum forms a core-shell catalytic nanoparticle having a palladium core and a platinum shell. Through an oxidation reduction reaction, platinum atoms displace the copper atoms on the palladium nanoparticle core. For example, the copper-coated palladium nanoparticle cores can be mixed with an aqueous solution containing a platinum salt. In a specific example, the platinum solution is 2 mM $PtK_2Cl_4$+0.05 M $H_2SO_4$ saturated with argon. Platinum ions of the solution are spontaneously reduced by copper as shown in equation (1), and platinum replaces copper on the palladium nanoparticle core.

$$Cu + Pt^{2+} \rightarrow Pt + Cu^{2+} \tag{1}$$

The platinum atoms are deposited as an atomically thin layer on the palladium core. In one example, the atomically thin layer is a platinum monolayer. The platinum monolayer generally covers the palladium core. However, some portions of the palladium core may not be covered with platinum atoms. There are several reasons for gaps or spaces in the platinum shell. First, underpotential deposition of copper onto palladium and displacement of copper with platinum are both 1:1 reactions. Under ideal conditions, the shell will contain one platinum atom for every palladium atom on the surface of the core. Each layer of atoms increases the particle size so that a full outer or surface layer contains more atoms than an inner or subsurface layer. Therefore, steps 146 and 148 will not provide enough platinum atoms to cover the entire surface of the palladium core.

Second, experimental results indicate un-replaced copper remains on the core-shell catalytic nanoparticles after step 148. The un-replaced copper can be copper that was oxidized during the deposition or displacement processes of steps 146 and 148. Platinum does not replace oxidized copper, and the copper oxide is present on the surface of the final core-shell catalytic nanoparticle structure.

Third, platinum atoms preferentially deposit on the existing platinum atoms, forming platinum clusters. Instead of replacing copper atoms to form a complete monolayer on the surface of the nanoparticle core, platinum atoms may deposit on existing platinum atoms.

In step 142, the percent surface area of the core-shell catalytic nanoparticle covered by platinum is increased by exposing the core-shell catalytic nanoparticles to a hydrogen environment (step 150), providing inert gas to the container (step 152), and adding an aqueous solution containing a platinum salt to the container (step 154). In step 142, platinum atoms displace palladium or copper atoms present after steps 146 and 148 to form a more complete platinum shell on the core-shell catalytic nanoparticles.

The core-shell catalytic nanoparticle of step 142 is incorporated into an electrode in step 144. As described above, the core-shell catalytic nanoparticle can be mixed with an ionomer to form a catalyst layer for an electrode of a fuel cell.

As described above, core-shell catalytic nanoparticles are formed by an underpotential deposition-displacement method as described in steps 146 and 148 above. After formation, the core-shell catalytic nanoparticles exposed to a hydrogen environment (step 150). For example, the core-shell catalytic nanoparticles can be stored in a container with hydrogen gas (step 150). Palladium absorbs hydrogen. In step 150, hydrogen absorbs into palladium atoms that are exposed on the surface of the core-shell catalytic nanoparticles to form palladium hydride (PdHx). For example, hydrogen absorbs into the palladium atoms exposed through pinholes in the platinum shell.

As discussed above, copper, most likely in the form of copper oxide, can also be present on the surface of the core-shell catalytic nanoparticles because platinum does not replace oxidized copper. Hydrogen reduces copper oxide to a metallic copper. The core-shell catalytic nanoparticles are stored in the hydrogen environment for a period of time so that hydrogen is absorbed into the exposed palladium atom and reduces the copper oxides on the surface of the core-shell catalytic nanoparticles to metallic copper. In one example, the core-shell catalytic nanoparticle is stored in a container with hydrogen gas for at least about one hour.

After storing the core-shell catalytic nanoparticles in the container having a hydrogen environment for a specified period of time, an inert gas is provided to the container in step 152. In one example, the inert gas is nitrogen. Other non-reactive gases, such as argon, neon, or a non-reactive compound gas can also be used.

Once an inert atmosphere is established in the container, an aqueous solution of a platinum salt is added to the core-shell catalytic nanoparticles in step 154. The aqueous solution includes a platinum(II) salt. Example platinum(II) salts include potassium tetrachloroplatinate ($K_2PtCl_4$), hydrogen hexachloroplatinate ($H_2PtCl_4$), platinum (II) cyanide (Pt $(CN)_2$), platinum(II) chloride ($PtCl_2$), platinum(II) bromide ($PtBr_2$), and platinum(II) acetylacetonate ($Pt(acac)_2$). In one example, the platinum(II) salt solution is 1 mM $PtK_2Cl_4$.

Platinum(II) salt is reduced by palladium hydride and metallic copper. During step 150, palladium exposed on the surface of the core-shell catalytic nanoparticle through pinholes absorbs hydrogen to form platinum hydride. The hydrogen of the palladium hydride reduces the platinum(II) salt so that platinum is deposited on the surface of the core-shell nanoparticle. The deposited platinum fills the pinholes that previously exposed the palladium. The deposited platinum increases the percentage of the surface area of the core-shell catalytic nanoparticles covered by platinum and forms a more complete shell on the palladium core.

The platinum(II) salt of the aqueous solution is also reduced by metallic copper. The metallic copper can be copper that was not replaced in step 148 or that was formed by reducing copper oxide in step 150. Through the oxidation reduction reaction described above, platinum atoms replace copper atoms on the surface of the core-shell catalytic nanoparticles. The core-shell catalytic nanoparticles of method 138 have a higher platinum mass activity than core-shell catalytic nanoparticles that are not subjected to steps 150, 152 and 154. At least one reason for the increased activity is because the platinum shell more completely covers the palladium core. As described above, platinum is deposited on core-shell catalyst nanoparticles to fill in the pinholes and replace copper remaining from the initial underpotential deposition of step 146.

Step 142 increases the percentage of surface area of the core-shell catalytic nanoparticles that are covered with platinum atoms. In step 154, the platinum preferentially deposits to fill the gaps or spaces between platinum atoms. The platinum increases the coverage of the platinum shell on the palladium core. As described above, platinum is reduced by palladium hydride. Platinum is reduced first by palladium hydride exposed through pinholes in the shell because it is easiest to leach hydrogen from these locations. The platinum reduced by palladium hydride deposits and fills the pinholes in the shell to form a more complete platinum shell on the palladium core.

Platinum is also reduced by metallic copper. As described above, the core-shell catalytic nanoparticles are formed by depositing a copper monolayer onto the palladium cores. Copper atoms of the monolayer can be oxidized during the process, and copper oxide is not replaced by platinum. Thus, after step 148, the platinum shell may be interrupted with regions of copper oxide. In step 150, copper oxide is reduced to metallic copper, and in step 154 platinum replaces the metallic copper on the surface of the core-shell catalytic nanoparticles. The platinum replaces the copper and forms a more complete platinum shell on the palladium core.

An inert atmosphere is created in step 150 to maximize the amount of platinum reduced on the surface of the core-shell catalytic nanoparticles. Hydrogen reduces platinum. Removing the hydrogen gas from the container prior to adding the platinum salt solution reduces the amount of platinum reduced by hydrogen in the environment and increases the amount of platinum reduced by copper and palladium hydride on the surface of the core-shell catalytic nanoparticles.

Steps 150, 152 and 154 increase the percentage of surface area of the core-shell catalytic nanoparticles covered by platinum by replacing palladium and copper exposed on the surface of the core-shell catalytic nanoparticle with platinum. Steps 150, 152 and 154 form a more complete shell or layer of platinum on the surface of the core-shell catalytic nanoparticles.

Figure 3C:
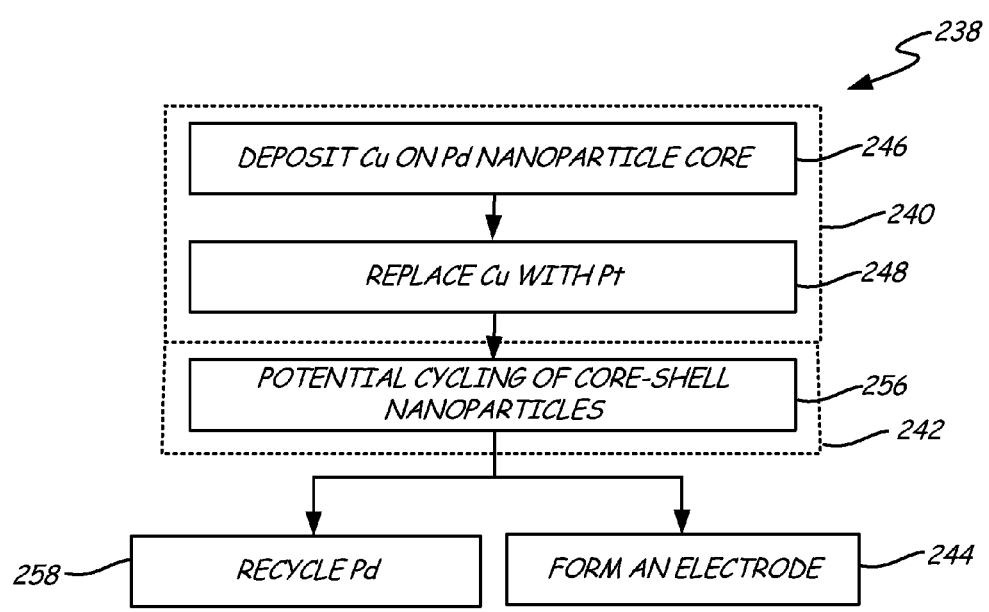
FIG. 3C is a block diagram illustrating another method of increasing percentage of surface area of the core-shell catalytic nanoparticle covered by platinum.

FIG. 3C illustrates another process for improving the platinum activity. Method 238 includes forming core-shell catalytic nanoparticles (step 240), increasing the percentage of surface area of the core-shell catalytic nanoparticles covered by platinum (step 242), forming an electrode (step 244), and recycling palladium (step 258). Forming the core-shell catalytic nanoparticles (step 240) includes depositing copper on palladium nanoparticle cores (step 246) and replacing copper with platinum (step 248). Steps 246 and 248 are the same as steps 146 and 148 described above with respect to FIG. 3B.

Increasing the percentage of surface area of the core-shell catalytic nanoparticles covered by platinum (step 242) includes potential cycling of the core-shell catalytic nanoparticles (step 256). In one example, the core-shell catalytic nanoparticles are subjected to square-wave potential cycling between about 0.65 volts and 1.0 volts with five seconds at each potential in a 0.1 M $HClO_4$ solution saturated with $O_2$. In another example, the core-shell catalytic nanoparticles are subjected to triangle-wave potential cycling between about 0.05 volts and 1.0 volts with five seconds at each potential in a 0.1 M $HClO_4$ solution saturated with $O_2$. Other potential cycling methods can also be used.

In step 256, the core-shell catalytic nanoparticles are pretreated with potential cycling prior to the core-shell catalytic nanoparticles being incorporated into a catalyst layer of an electrode. In step 256, the potential cycling of the core-shell catalytic nanoparticles results in palladium dissolution and makes the surface of the core-shell catalysts more compact with pure platinum or platinum alloy atoms. In another example, the core-shell catalytic nanoparticles are subjected to about 200 cycles. In this example, a small amount of core-shell catalytic nanoparticles (i.e., less than about 100 mg) were present. When the amount of core-shell catalytic nanoparticles is large, the cycling number and/or potential cycling period should be increased. In a further example, the core-shell catalytic nanoparticles are subjected to more than about 50 cycles and less than about 5000 cycles. Potential cycling of the core-shell catalytic nanoparticles increases the mass activity. In one example, the mass activity of the core-shell catalytic nanoparticles is increased by at least about 20% after potential cycling. Any potential cycling protocol which results in palladium dissolution can be used. For example, a different potential cycling protocol, a different potential range, a different time, or a combination thereof can be used.

As described above, the core-shell catalyst nanoparticles formed in step 248 do not have a complete platinum shell. Instead, gaps or spaces, which are known as pinholes, can exist between platinum atoms. Pinholes in the platinum shell expose the underlying palladium core. During potential cycling, the exposed palladium can dissolve. Palladium dissolution reduces the size of the palladium core, and the platinum atoms of the shell diffuse to create a more compact catalyst. As the palladium core gets smaller, the surface area of the palladium core also decreases. Thus, more of the palladium core surface area can be covered with the platinum present, and the pinholes become smaller and less in number.

In step 256, the percentage of surface area of core-shell catalytic nanoparticles covered with platinum is increased by dissolution of the palladium core. The platinum atoms of the shell will move to accommodate the smaller palladium core and will form a more compact platinum shell.

In step 244, an electrode is formed with the core-shell catalytic nanoparticles. The enhanced core-shell catalytic nanoparticles formed in step 256 are incorporated into a catalyst layer for use in an electrochemical cell. In one example, the core-shell catalytic nanoparticles of step 256 are incorporated into cathode CL 18 of FIG. 1. The enhanced core-shell catalytic nanoparticles formed by method 238 are more compact, active and durable than core-shell catalytic nanoparticles of step 248.

The electrode of step 256 can also require less conditioning time. Typically fuel cells are conditioned to optimize the performance of the fuel cell and the electrodes. The conditioning protocol can include one hundred hours of potential cycling. Because the core-shell catalytic nanoparticles have already been subjected to potential cycling in step 256, the conditioning time of the electrode and fuel cell can be reduced.

In step 258, the leached palladium is recycled. Recycling the palladium leached from the core-shell catalytic nanoparticles reduces material costs.

Leaching the palladium core before the core-shell catalysts are incorporated into an electrode reduces possible palladium contamination of the membrane or catalyst layer. Additionally, the leaching of the palladium core during step 258 results in a structural change of the core-shell catalyst nanoparticles (i.e., the core-shell catalyst nanoparticles become smaller and more compact). In method 238, the structural change takes place before the core-shell catalytic nanoparticles are incorporated into a catalyst layer.

Figure 3D:
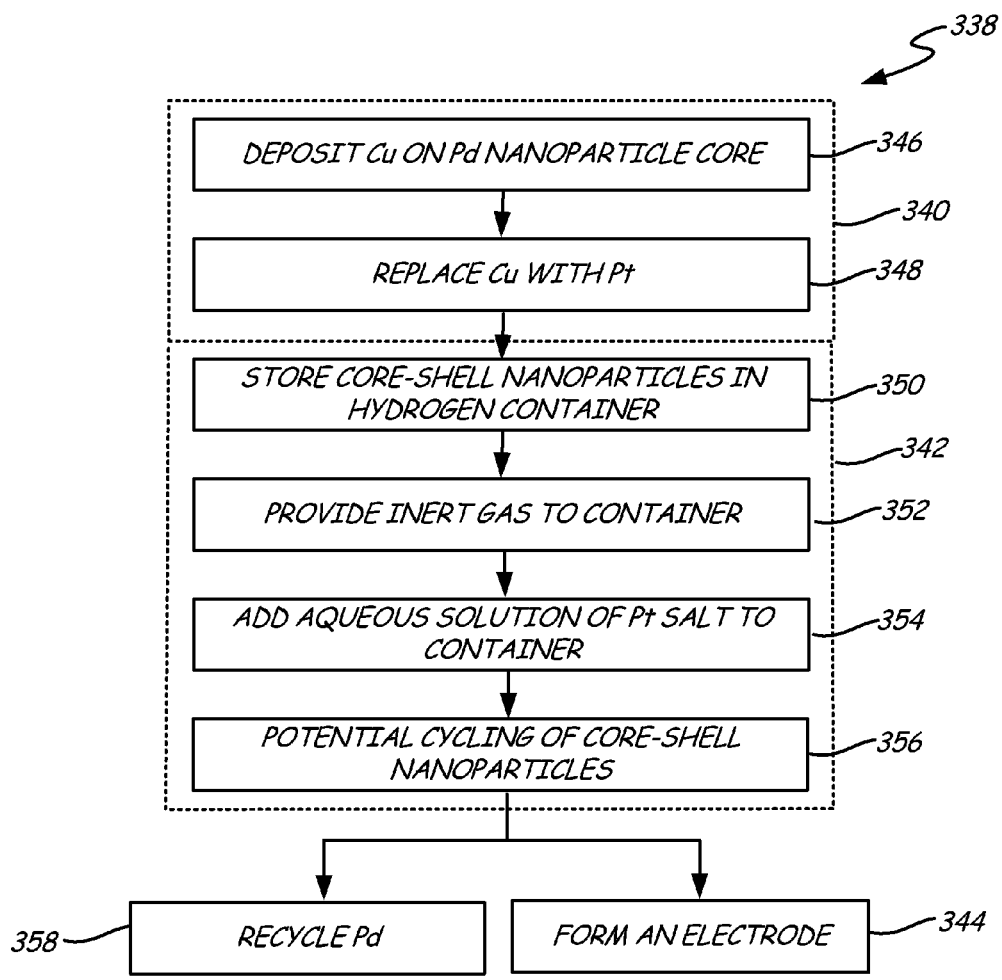
FIG. 3D is a block diagram illustrating a further method of increasing percentage of surface area of the core-shell catalytic nanoparticle covered by platinum.

Methods 138 and 238 are not exclusive. As shown in method 338 of FIG. 3D, these methods can be combined. Method 338 includes forming core-shell catalytic nanoparticles (step 340), increasing the percentage of platinum on the core-shell catalytic nanoparticles (step 342), and forming an electrode (step 344). Step 340 is similar to step 140 and includes depositing copper on palladium nanoparticle cores (step 346) and replacing copper with platinum (step 348).

After forming the core-shell catalytic nanoparticles in step 340, the core-shell catalytic nanoparticles are stored in a container with hydrogen gas (step 350). As described above with respect to step 150 of FIG. 3B, hydrogen absorbs into palladium to form palladium hydride and reduces copper oxides to metallic copper.

After a specified period of time, the nitrogen gas is switched to an inert gas (step 352). The inert gas creates an inert atmosphere in the container.

Next, an aqueous solution of platinum salt is provided in the container (step 354). Step 354 is similar to step 154 of FIG. 3B. Platinum is reduced by palladium hydride and metallic copper and deposits on the surface of the core-shell catalytic nanoparticles to form a more complete layer or shell on the palladium core.

In step 356, the core-shell catalytic nanoparticles of step 354 are subjected to potential cycling similar to that of step 256. During potential cycling, the platinum atoms of the platinum shell can diffuse. Such movement creates pinholes that can expose the palladium core. As described above, palladium dissolution can occur due to palladium being exposed through pinholes in the platinum shell. Palladium dissolution reduces the size of the palladium core, and the platinum atoms adjust on the surface of the palladium core to accommodate the change.

After depositing additional platinum on the palladium core in steps 350, 352 and 354, and potential cycling in step 356, the core-shell catalytic nanoparticle is incorporated into an electrode in step 344. Step 344 is similar to step 146 of FIG. 3B. In step 358, the dissolved palladium from step 356 is recycled. Recycling the palladium leached from the palladium core during step 356 reduces the material costs.

As illustrated in the following examples, increasing the percentage of the surface area of the core-shell catalytic nanoparticles covered by platinum atoms increases the platinum mass activity. The following examples are intended as illustrations only, since numerous modifications and variations within the scope of the present invention will be apparent to one skilled in the art.

Example A

Core-shell catalytic nanoparticles A were formed by underpotential deposition of copper and platinum replacement.

Core-shell catalytic nanoparticles B were formed using the same underpotential deposition of copper and platinum replacement as core-shell catalytic nanoparticles A. Core-shell catalytic nanoparticles B were then stored in a container with hydrogen gas ($H_2$) for about an hour. After an hour, the gas feed to the container was switched to nitrogen ($N_2$). After 2 minutes, a 1 mM $K_2PtCl_4$+50 mM $H_2SO_4$ solution was added and dispersed in the container with nitrogen purging continuously.

Electrode A was formed with core-shell catalytic nanoparticles A, and electrode B was formed with core-shell catalytic nanoparticles B. Electrode A and electrode B both had a platinum loading of 25 µg/cm². The electrolyte was 0.1 M $HClO_4$ solution saturated with $O_2$, and the rotating speed was 1600 rpm. The platinum mass activity at 0.9 volts and the inductivity coupled plasma (ICP) mass spectroscopy values are presented in Table 1.

TABLE 1

| Core-shell nanoparticles | Pt mass activity (A/mg) | ICP |
| --- | --- | --- |
| A | 0.2 | Pt: 10.9% |
|   |   | Pd: 14.7% |
|   |   | Cu: 0.5% |
| B | 0.4 | Pt: 13.2% |
|   |   | Pd: 13.3% |
|   |   | Cu: 0.2% |

As shown in Table 1, core-shell catalytic nanoparticles B, which were stored in a container with hydrogen gas and mixed with an aqueous platinum salt solution, had a greater platinum mass activity than core-shell catalytic nanoparticles A. Additionally, core-shell catalytic nanoparticles B had a greater weight percentage of platinum and a smaller percentage of copper and palladium compared to core-shell catalytic nanoparticles A.

Example B

Core-shell catalytic nanoparticles C were formed having a palladium core and a platinum shell.

Core-shell catalytic nanoparticles D were formed using the same process as used for core-shell catalytic nanoparticles C. Core-shell catalytic nanoparticles D were subjected to square-wave potential cycling between about 0.65 volts and 1.0 volts with five seconds at each potential in a 0.1 M $HClO_4$ solution saturated with $O_2$. The core-shell catalytic nanoparticles D were subjected to 200 cycles.

Electrode C was formed with core-shell catalytic nanoparticles C, and electrode D was formed with core-shell catalytic nanoparticles D. Electrode C and electrode D were subjected to the same test conditions. The platinum mass activity for each electrode is presented in Table 2.

TABLE 2

| Core-shell nanoparticles | Pt mass activity (A/mg) |
| --- | --- |
| C | 0.4 |
| D | 0.6 |

As shown in Table 2, core-shell catalytic nanoparticles D, which were subject to potential cycling before being incorporated into electrode D, had a greater platinum mass activity than core-shell catalytic nanoparticles C.

Although the present invention has been described with reference to preferred embodiments, workers skilled in the art will recognize that changes may be made in form and detail without departing from the spirit and scope of the invention.

The invention claimed is:

1. A method for forming catalytic nanoparticles, the method comprising:
    forming core-shell catalytic nanoparticles having a palladium core enclosed by a platinum shell; and
    increasing a percentage of surface area of the core-shell catalytic nanoparticles covered by the platinum shell by further processing the core-shell catalytic nanoparticles, wherein increasing the percentage of surface area of the core-shell catalytic nanoparticles covered by the platinum shell comprises A) or B):
        A) storing the core-shell catalytic nanoparticles in a hydrogen environment to absorb hydrogen into the palladium core; and
        depositing platinum atoms on the surface of the core-shell catalytic nanoparticles by reducing a platinum salt with the hydrogen absorbed into the palladium core; or
        B) subjecting the core-shell catalytic nanoparticles to potential cycling before incorporating the core-shell catalytic nanoparticles into a catalyst layer of an electrochemical cell.

2. The method of claim 1, wherein the platinum salt is a platinum(II) salt.

3. The method of claim 1, wherein the platinum salt is selected from the group consisting of: potassium tetrachloroplatinate ($K_2PtCl_4$), hydrogen hexachloroplatinate ($H_2PtCl_4$), platinum (II) cyanide ($Pt(CN)_2$), platinum(II) chloride ($PtCl_2$), platinum(II) bromide ($PtBr_2$), and platinum (II) acetylacetonate ($Pt(acac)_2$).

4. The method of claim 1, wherein depositing platinum atoms on the surface of the core-shell catalytic nanoparticles comprises:
    exposing the core-shell catalytic nanoparticles to an inert atmosphere; and
    mixing the core-shell catalytic nanoparticles with an aqueous solution containing the platinum salt.

5. The method of claim 1, wherein the core-shell catalytic nanoparticles have a greater percentage of platinum by weight and a smaller percentage of palladium by weight after platinum atoms are deposited on the surface of the core-shell catalytic nanoparticles by reducing the platinum salt.

6. The method of claim 1, wherein subjecting the core-shell catalytic nanoparticle to potential cycling comprises:
    subjecting the core-shell catalytic nanoparticles to potential cycling between 0.65 volts and 1.0 volts.

7. The method of claim 1, wherein subjecting the core-shell catalytic nanoparticle to potential cycling comprises:
    subjecting the core-shell catalytic nanoparticles to at least about 50 potential cycles with at least about 5 seconds at each potential.

8. The method of claim 1, wherein a mass activity of the core-shell catalytic nanoparticles is increased by at least about 20% after the potential cycling.

9. A method for forming a catalytic nanoparticle for use in an electrochemical cell, the method comprising:
    depositing copper on a palladium nanoparticle core;
    replacing the copper with a shell of platinum atoms to form a core-shell nanoparticle, the shell covering a portion of an exterior surface of the palladium nanoparticle core; and
    reducing pinholes in the shell after replacing the copper so that platinum atoms cover a greater percentage of surface area of the core-shell nanoparticle,
    wherein reducing pinholes in the shell comprises:
        exposing the core-shell catalytic nanoparticle to a hydrogen environment; and
        mixing the core-shell catalytic nanoparticle with an aqueous mixture containing a platinum salt after storing the core-shell catalytic nanoparticle in the hydrogen environment.

10. The method of claim 9, wherein mixing the core-shell catalytic nanoparticle with an aqueous mixture comprises:
    mixing the core-shell catalytic nanoparticle with an aqueous mixture containing a platinum salt in an inert environment.

11. The method of claim 10, wherein the inert environment is selected from a nitrogen environment and an argon environment.

12. The method of claim 9, wherein the platinum salt is a platinum(II) salt.

13. The method of claim 9, wherein the platinum salt is selected from the group consisting of: potassium tetrachloroplatinate ($K_2PtCl_4$), hydrogen hexachloroplatinate ($H_2PtCl_4$), platinum (II) cyanide ($Pt(CN)_2$), platinum(II) chloride ($PtCl_2$), platinum(II) bromide ($PtBr_2$), and platinum (II) acetylacetonate ($Pt(acac)_2$).

14. The method of claim 9, wherein after the step of reducing pinholes in the shell, the core-shell catalytic nanoparticle contains a greater weight percentage of platinum and a smaller weight percentage of palladium and copper compared to that before the step of reducing the pinholes.

15. The method of claim 9, wherein reducing pinholes in the shell comprises:
    subjecting the core-shell catalytic nanoparticle to potential cycling before incorporating the core-shell catalytic nanoparticle into a catalyst layer of an electrochemical cell.

16. The method of claim 15, wherein subjecting the core-shell catalytic nanoparticle to potential cycling comprises:
    subjecting the core-shell catalytic nanoparticle to potential cycling between 0.65 volts for about five seconds and 1.0 volt for about 5 seconds.

17. The method of claim 15, wherein subjecting the core-shell catalytic nanoparticle to potential cycling comprises:
    subjecting the core-shell catalytic nanoparticle to at least about 50 and less than about 5000 potential cycles.

18. The method of claim 15, and further comprising:
    recycling palladium that is leached from the palladium core nanoparticle during the potential cycling.

19. The method of claim 15, wherein after the step of subjecting the core-shell catalytic nanoparticle to potential cycling, the mass activity of the core-shell catalytic nanoparticle is increased by 20% compared to that of the core-shell catalytic nanoparticle before the step of potential cycling.

* * * * *